Oct. 25, 1927.
W. F. SUTHERLAND
1,646,634
ELECTRICAL MEASURING INSTRUMENT
Filed Aug. 28, 1925
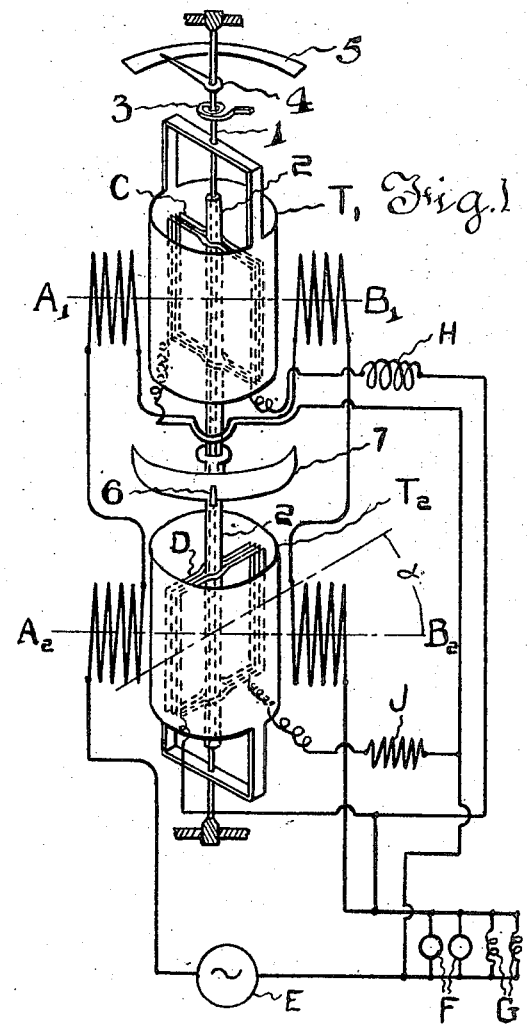
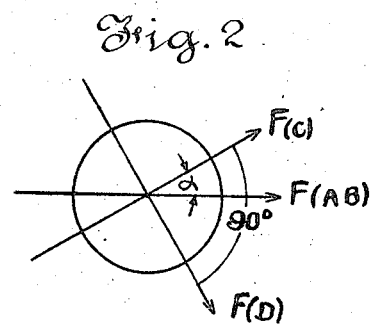
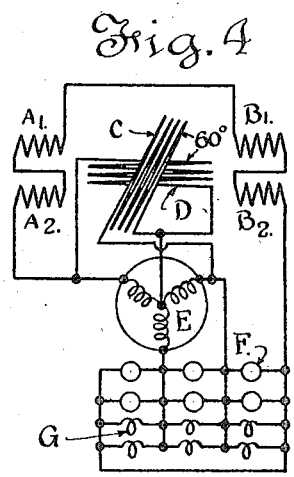
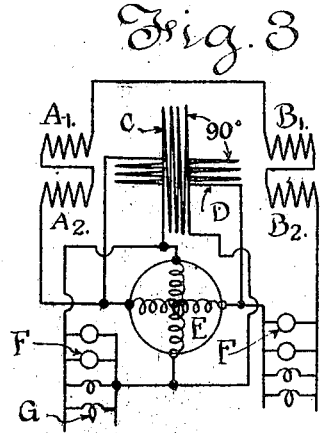
INVENTOR
W. F. Sutherland
BY J. E. Maybee
ATTY.

Patented Oct. 25, 1927.

1,646,634

UNITED STATES PATENT OFFICE.

WILLIAM FRANK SUTHERLAND, OF TORONTO, ONTARIO, CANADA.

ELECTRICAL MEASURING INSTRUMENT.

Application filed August 28, 1925. Serial No. 53,095.

My invention relates to meters or other instruments of the type wherein mechanical movements are produced proportionate to the quantitive electrical characteristics of a circuit under consideration, and particularly to that type of instrument which indicates the product of volts and amperes in an electrical circuit through which an alternating current is flowing. More particularly the object of the invention is to provide a method and a mechanism incorporating the method whereby through the intermediary of suitable and well known recording or indicating means the product of the voltage and current will be given without respect to any phase difference which may exist between them.

Various arrangements have been suggested from time to time and I am well acquainted with the prior state of the art. In particular I am well aware of the claims advanced in United States Patents Nos. 1,342,081 and 1,342,082, in which methods are given for the "operation of an alternating current wattmeter which consists in impressing on its voltage coils a voltage proportional to the voltage of an alternating current circuit, supplying to the current winding of the said meter a current proportional to the current in the said circuit, and shifting the phase position of the current supplied to the current winding of the said meter with respect to the current in said circuit oppositely to any phase shifts which occur in the circuit with respect to the voltage of said circuit."

I am also aware of the construction shown in British Patent 131,405 of 1919 wherein a voltage element energized by two or more currents proportional to line voltage and of differing phase relationships is placed in inductive relationship with a current element energized by a current proportional to line current, a torque element being interposed between the aforesaid voltage and current elements.

In the above mentioned patent the voltage element is capable of rotation about its axis so that an equilibrium position is maintained in which a flux due to any or all of the voltage coils and which is displaced by a constant value of 90 electrical degrees from the flux due to the current coils, interacts with this current flux to produce torque. In other words, in the above mentioned patents, the flux due to line current and that due to line voltage which interact in the meter element to produce a torque proportional to volt-amperes, vary respectively in magnitude as the line current and voltage but are fixed in respect to their relative phase displacement, irrespective of the phase displacement existing between line current and line voltage.

My invention differs materially from that claimed in the above mentioned patents, in that the fluxes due to line current and line voltage, acting on the torque element of my measuring instrument are not only proportional in magnitude to the current and voltage but also vary in phase relationship in agreement with the phase relationship existing between the line current and line voltage. Compensation is not obtained for varying power factor by the securing of a constant phase relationship between the fluxes in the meter irrespective of the phase relationship of line current and voltage, but by a mechanical compensation for this varying phase angle, the meter fluxes producing torque being proportional to and in definite and fixed phase relationship with the line current and voltage.

I attain my object through the creation and summation of two or more torques, the algebraic resultant torque sum being proportional to the product of the line current and line voltage of the alternating current circuit under consideration.

More particularly my invention can be considered as providing for the summation of two or more torques the algebraic sum of which is proportional to $EI \sin^2\theta + EI \cos^2\theta$: where "E" is the line voltage; "I" the line current, and "$\theta$" the phase angle of the line current with respect to line voltage or impressed E. M. F. The summation of two torques groups, $EI \sin^2\theta$ and $EI \cos^2\theta$ produces a resultant torque equal to EI without respect to the phase angle $\theta$ existing between line current and line voltage.

The novel features of the invention which I believe to be patentable are definitely set forth in the appended claims. The principle of the invention together with the construction and mode of operation of one type of mechanism embodying the invention will be best understood from the following description together with the accompanying drawing, in which Fig. 1 is a view partly in perspective and partly diagrammatic of an instrument embodying the general method;

Fig. 2 is a diagram illustrating in plan the flux relations existing in the magnetic circuits of Fig. 1; and Figs. 3 and 4 are similar views showing modified arrangements.

In Fig. 1 a source of alternating current energy "E" is shown, the current from which passes successively through the current coils $A_2A_1$, $B_1B_2$ and through a typical load F of non-inductive lamps and G, other apparatus such as motors or the like possessing magnetic circuits and requiring magnetizing current for their operation. In the arrangement shown the coils $A_1B_1$ and $A_2B_2$ have axes lying in the same plane.

The voltage coils C and D are energized by current drawn from the supply lines and proportional to line voltage. Coil C is energized through an inductance H while coil D is energized through a resistance J, the values being so chosen that the current through C lags nearly 90 degrees behind that in D, any want of exact quadrature being compensated for by a slight adjustment of the relative angle that coils C and D bear to each other. In what follows this angle is assumed to be 90 degrees. Other means of securing quadrature relationships between these two voltage currents flowing in C and D will readily occur to those versed in the art.

In the arrangement shown the coils C and D are rigidly coupled so that at all times the definite angle of 90 degrees is maintained between them, but the combination is free to rotate as a unit about an axis through the planes of the coils, a quill 2 being provided for this purpose.

Fig. 2 represents the relative directions in space of the fluxes produced by the windings above described. $F_{AB}$ is the direction of the flux produced by coils $A_1B_1$ and $A_2B_2$. $F_C$ is the direction in space of the flux produced by coil C. The angle $\alpha$ which this flux makes with the flux $F_{AB}$ corresponds to the angle $\alpha$ in Fig. 1 which the plane of the coil D makes with the axis of $A_2B_2$. $F_D$ is the flux produced by the coil D and makes an angle of 90° with respect to flux $F_C$.

It can be proven mathematically and from electrical considerations that owing to the respective torques set up between the coils ($A_2B_2$ and D) and ($A_1B_1$ and C) the angle $\alpha$ will equal the complement of the phase angle existing between line voltage and line current, that is $\alpha = 90 - \theta$.

In Fig. 1, $T_1$ and $T_2$ represent the torque members of the proposed mechanism. In the particular case shown they are represented as cylindrical non-magnetic conductors interposed in the annular space between the torque producing current and voltage elements, but obviously may have any other suitable form such as discs, depending upon the arrangement of flux paths. The torque members $T_1$ and $T_2$ are mounted so as to be rotatable and according to the function to be performed can be restrained by a spring as in indicating and recording instruments or as in relays. As an indication of one method of metering, an indicating hand 4 is shown together with a torque spring 3 both attached to the torque shaft 1. The resulting indication on the dial 5 will thus be proportional to torque.

While the coils $A_1B_1$, $A_2B_2$, C and D serve to set up an equilibrium position amongst themselves which is dependent upon the phase angle of the line voltage and line current, they also severally set up induced E. M. F.'s in the torque members. Consequently induced currents flow in the torque members, dependent in magnitude and phase relation upon the magnetic fluxes causing them. While these induced currents are thus proportional to the line voltage and current and are in fixed phase relationship thereto, their angular position one to the other in the torque member, in contradistinction to their electrical phase displacement, also varies with the angle $\alpha$ and consequently with the angle $\theta$.

The induced currents in the torque members, interacting with the various fluxes, set up torques the sum of which can be proven to be proportional to the product of the volts and amperes in the circuit being measured, as follows:

The torques set up in the torque member $T_1$ are proportional to line current; to line voltage; to the vector angle existing between line current and line voltage; and also to the mechanical angle existing between the two sets of coils $A_1B_1$ and C. It can readily be demonstrated that the current induced in the torque member by the line current in coils $A_1B_1$ and cut by the flux created by the current proportional to line voltage but in phase quadrature therewith in coil C, produces a torque which can be represented by means of the expression $EI \cos \theta \sin \alpha$ or since $\alpha = (90 - \theta)$, by substitution the torque will be found equal to $EI \cos^2 \theta$. The current induced in the torque member by the voltage current in coil C and cut by the flux due to line current in coils $A_1B_1$ also produces a torque proportional to $EI \cos^2 \theta$.

Similarly it can be proven that the torques set up in the torque member $T_2$ by line current in coils $A_2B_2$ and by current proportional to line voltage in coil D and affected by the varying angle which these coils make with one another are equal to $EI \sin^2 \theta$. The two torques $EI \sin^2 \theta$ and $EI \cos^2 \theta$ are additive and reduce to the product EI which is representative of the volt-amperes flowing in the circuit, to some proportion.

In the arrangement shown in Fig. 1, the torque proportional to $EI \sin^2\theta$ and that proportional to $EI \cos^2\theta$ are produced in separate torque members $T_1$ and $T_2$. The windings have been separated and grouped in two planes both perpendicular to the axis of the shaft 1 which carries $T_1$ and $T_2$. Coil C is separated from coil D in such a manner that their fluxes do not intersect but lie in two perpendicular planes each of which is perpendicular to the torque shaft 1. Coils C and D are rigidly fastened together by means of the quill 2 and are free to rotate about a common axis. Bearings for the quill 2 are understood but have been omitted for the sake of simplicity.

The arrangement indicated in the figures is merely indicative of a mechanism embodying the essential principle of the invention and a number of variations in the arrangement of the actual mechanism can be carried out without departing from the spirit of the invention.

One of the most important of these is inherent in the possibility of using voltage currents and in consequence voltage fluxes differing in phase by some other fixed angle than the angle which has been assumed in the treatment so far for the sake of simplicity. It is a well known fact that a circular rotating field can be produced by polyphase currents differing in phase relation by other than 90°, and for the employment of voltage fluxes in the type of arrangement of Fig. 1, due to polyphase voltage, it is thus only necessary to so position the coils that a rotating field would be produced if their axes intersected, which is achieved by making the fixed angle, between the coils C and D of Fig. 1, the supplement of the electrical angle between their currents. The importance of this is seen in the possibility of thus conveniently measuring the volt-amperes in polyphase circuits. For instance, in single-phase measurements a voltage in quadrature with the line voltage would be obtained by any suitable and well-known means and would be impressed across one of the voltage windings, the other voltage winding having a voltage of similar magnitude but in phase agreement with the line voltage impressed across its terminals.

For two-phase measurement it would only be necessary to impress the two-phase voltages one across each of the voltage windings. For these two types of circuits the angle between the windings C and D would be made as before described equal to 90°. An arrangement for use with two-phase currents is shown in Fig. 3 in which the various windings bear the same reference letters as in Fig. 1 which are shown connected in a two phase circuit for measuring the volt amperes in one phase. The coils C and D while shown superimposed in plan retain axially spaced positions. For three-phase measurement the angle could still be made 90°, a quadrature voltage being obtained by the usual methods or, since the line voltages have a phase displacement of 120° the coils C and D could have a mechanical angle between them of 60°, with two line voltages being impressed directly on the voltage windings. This arrangement is shown in Fig. 4 in which the connections are shown for one type of three-phase circuit. Coils C and D are displaced 60° relative to one another. It is also recognized that adjustment for certain numerical constants would be introduced in the measurement of polyphase circuits when necessary.

Arrangements such as above described are capable of measuring the volt-amperes in one single-phase component of a polyphase circuit or the volt-amperes in a balanced polyphase circuit.

The exact arrangement of parts shown need not be adhered to; it is only essential that the combination of fluxes and induced currents be correct for the achieving of the result desired. For instance, a variation can be made with advantage by the use of iron in the magnetic circuits. This variation leads to the possibility of keeping all the windings stationary and arranging for the rotatability of an armature of high magnetic permeability within the coils C and D of Fig. 1.

While the primary purpose of the measuring instrument in its various modifications is the measuring of the product of the volts and amperes in a circuit by indicating the instantaneous values thereof, giving a graphic record thereof or by integrating the values over a period of time, a secondary function can be performed in the indicating or recording of phase angle of line voltage and current. The rotative windings or flux element, as the case may be, take up a position such that the angle between one of the shifting fluxes and the stationary flux acting on the torque element, is proportional to the phase angle existing in the circuit under consideration. Thus by attaching a pointer or a means for giving a graphic record to the rotative flux element or windings this visual indication or record can be achieved. In Fig. 1 a pointer 6, attached to the quill 2 is shown travelling over a scale 7 which can be divided in any suitable manner.

It is to be understood that the usual auxiliary instruments such as current transformers, potential transformers etc., and the usual well understood instrument connections can be introduced into the exterior circuits as and when desired.

While in the foregoing specification the coils C and D have been described as being energized by current proportional to line voltage and while the coils $A_1B_1$, $A_2B_2$ as the case may be have been described as being energized by a current proportional to the line current, these coils may be energized in the reverse order; that is coils C and D can be energized by line current while the remaining group of coils can be energized by line voltage. It is only necessary that one group of windings be energized in such a manner as to produce a rotating field proportional in magnitude to one of the quantities being measured should their axes intersect while the other set of windings should be energized by the remaining component of the volt-ampere product desired.

Further, the term electrical measuring instrument is here defined as embracing not only what are commonly known as meters but also relays and the like. Also the term rotative or rotation is here taken to mean angular displacement through a limited portion of one revolution as well as through one or more complete revolutions.

What I claim is:—

1. An electrical measuring instrument for the measurement of the product of the voltage and amperage in an alternating current circuit comprising a torque element including two torque members; means for producing in one torque member a torque proportional to $EI \cos^2\theta$; and means for producing therein a torpue proportional to $EI \sin^2\theta$ so that the torque sum is proportional to $EI (\cos^2\theta + \sin^2\theta) = EI$, where E is a measure of the voltage existing in the circuit, I a measure of the current flowing and $\theta$ a measure of the phase angle existing between them, the said torque producing means being magnetically isolated the one from the other.

2. An electrical measuring instrument for the measurement of the product of the voltage and amperage in an alternating current circuit comprising a torque element including two torque members; means comprising voltage and current windings producing voltage and current fluxes interacting with one member of the torque element to produce a torque proportional to $EI \cos^2\theta$; and means comprising voltage and current windings magnetically isolated from the windings aforesaid and producing other voltage and current fluxes interacting with the other member of the torque element to produce a torque proportional to $EI \sin^2\theta$ so that the torque sum is proportional to EI, as in claim 1; and wherein the torque's porportional to the square of the angular functions $\sin^2\theta$ and $\cos^2\theta$ are produced by a mechanical displacement of the means for producing the respective fluxes with respect to the torque element, proportional to the phase angle of the line current with respect to line voltage.

3. An electrical measuring instrument for the measurement of the product of the voltage and amperage in an alternating current circuit comprising a plurality of torque members each being acted upon by torque producing means comprising current and voltage windings producing relatively spacially movable voltage and current fluxes interacting to set up a position of equilibrium in space and cutting said torque members; said voltage windings being spacially disposed so as to produce non-intersecting flux paths and said current windings being energized from the same phase of the supply circuit.

4. An electrical measuring instrument for the measurement of the product of the voltage and amperage in an alternating current circuit comprising a plurality of torque members and a corresponding plurality of torque producing means comprising current and voltage windings relatively movable and adapted to produce fluxes interacting to set up a position of equilibrium between the said windings and cutting said torque elements, in which the voltage windings are so arranged as to produce non-intersecting flux paths, and in which the current windings are excited from the same phase of the supply circuit.

5. An electrical measuring instrument for the measurement of the product of the voltage and amperage in an alternating current circuit comprising a plurality of torque units each comprising a torque member, coupled to another; current windings excited in proportion to line current by currents of the same phase, and voltage windings excited in proportion to voltage by currents differing in phase as between the voltage windings of each torque unit, said windings being mounted to permit of the relative movement of the voltage and current fluxes in respect to the torque elements with changes in the power factor of the circuit under measurement, and said current windings being excited from the same phase of the supply circuit.

6. An electrical measuring instrument for the measurement of the product of the voltage and amperage in an alternating current circuit comprising a spindle; a torque element comprising torque members axially spaced and secured to said spindle; current windings arranged in co-operative relationship with the said torque members; voltage windings arranged in co-operative relationship with the said torque members and with the current windings; means for energizing one set of windings with currents differing in phase relationship by a fixed value, said windings being movably mounted to permit of the relative movement of the voltage and current fluxes with changes in the power factor of the circuit under measurement, and means for energizing the other set of windings by currents of the same phase.

7. An electrical measuring instrument for the measurement of the product of the voltage and amperage in an alternating current circuit comprising a spindle; a torque element comprising two torque members axially spaced and secured to said spindle; current coils arranged in co-operative relationship with the said members and energized by currents of the same phase; a voltage coil arranged in co-operative relationship with the first torque member; a second voltage coil arranged in co-operative relationship with the second torque member but positioned at right angles to the first; said voltage windings being energized by currents differing 90° in phase; said windings being mounted to permit of the relative movement of the voltage and current fluxes with changes in the power factor of the circuit under measurement.

Signed at Toronto, Canada, this 19 day of August, 1925.

WILLIAM FRANK SUTHERLAND.